R. R. ROOT.
INCUBATOR.
APPLICATION FILED AUG. 1, 1908.
1,185,613.
Patented May 30, 1916.
2 SHEETS—SHEET 1.
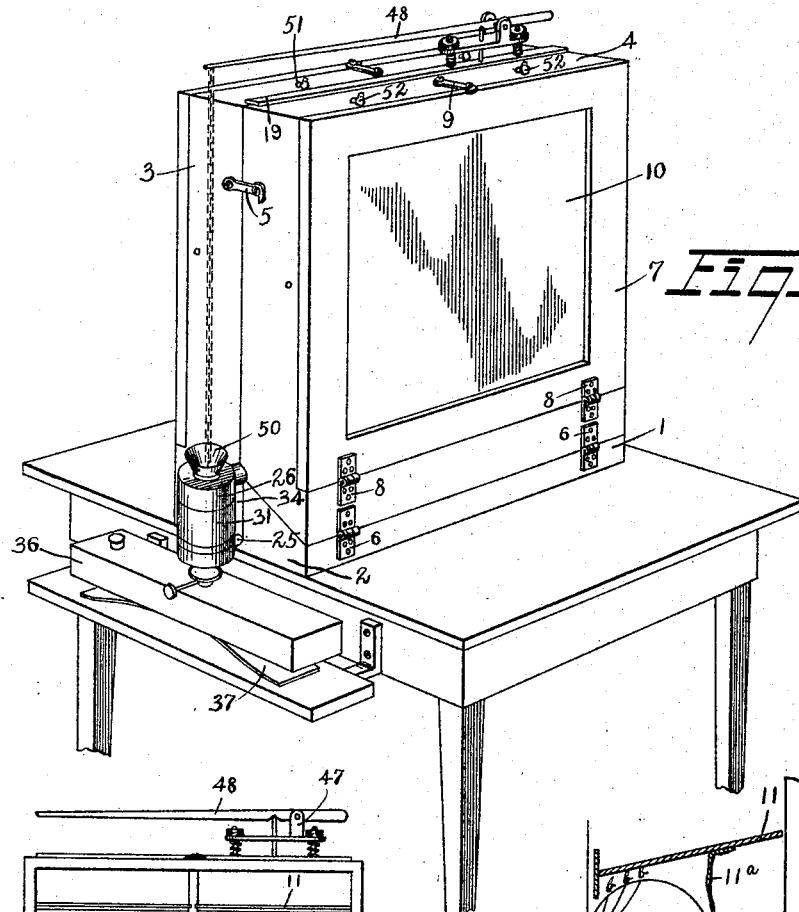
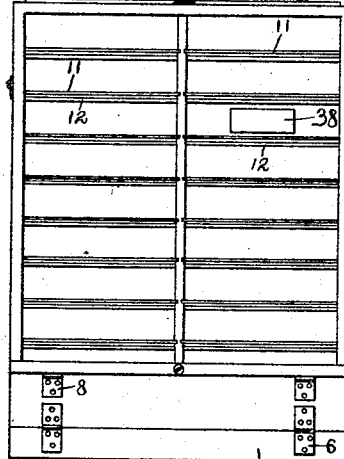
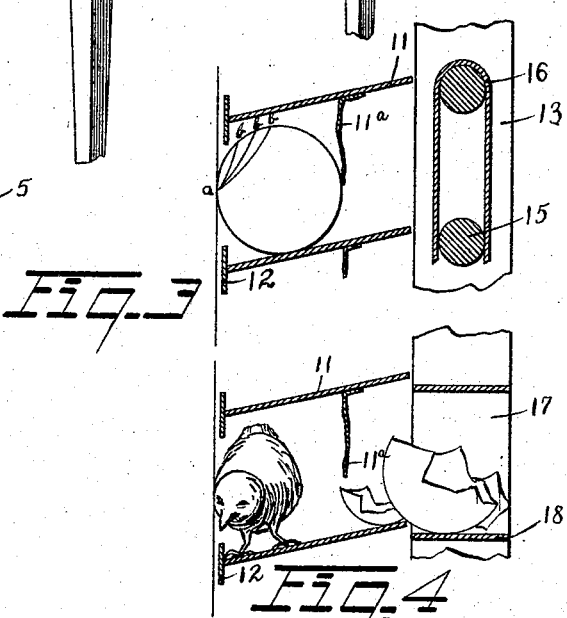
Witnesses:
Nathan F. Fretter.
Arthur S. Remsberg.
Inventor.
Ralph R. Root
By Bates, Fouts & Hull
Attys

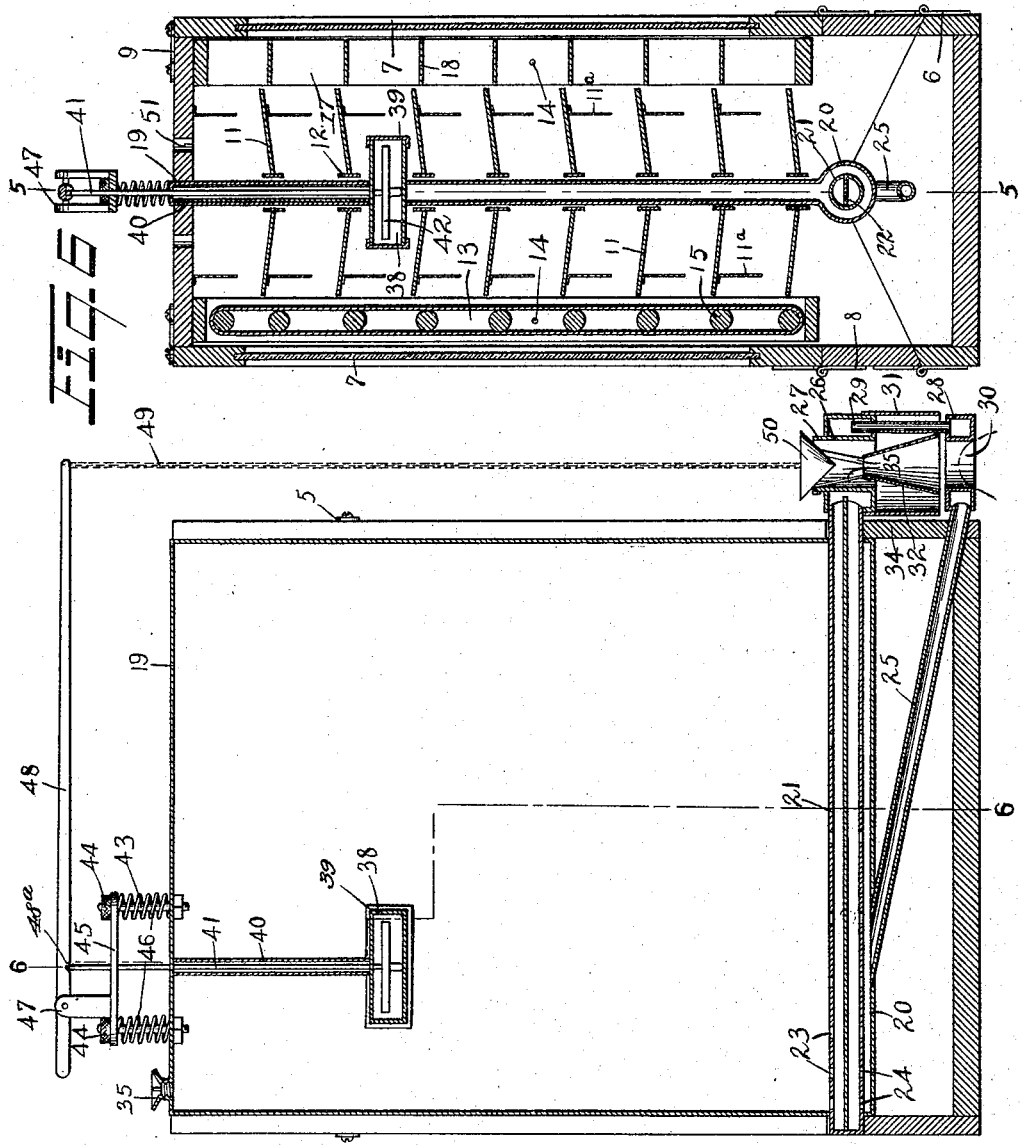

UNITED STATES PATENT OFFICE.

RALPH R. ROOT, OF CLEVELAND, OHIO.

INCUBATOR.

1,185,613. Specification of Letters Patent. Patented May 30, 1916.

Application filed August 1, 1908. Serial No. 446,405.

*To all whom it may concern:*

Be it known that I, RALPH R. ROOT, a citizen of the United States, residing at Cleveland, in the county of Cuyahoga and State of Ohio, have invented a certain new and useful Improvement in Incubators, of which the following is a full, clear, and exact description, reference being had to the accompanying drawings.

My invention relates to incubators and has for its object the provision of an incubator in which the eggs are maintained in contact with a heating device throughout the period of their incubation.

It also comprises a means for rotating the eggs so as to change their point of contact with the heater, and provision of means whereby the chicks when hatched may push the shell out of the way and be in contact with the heater itself.

It also comprises a novel form of heating device with means for regulating the supply of heat to said heating device by the temperature of the heating device itself.

It also comprises a casing which is easily assembled and taken apart, allowing access to the various parts of the incubator.

Generally speaking, the invention comprises the elements and combinations thereof as set forth in the claims.

Reference should be had to the accompanying drawings in which—

Figure 1 is a perspective view of my incubator, the same being mounted upon a table with the heating lamp in proper relation to the incubator; Fig. 2 is a front elevation of the incubator with the outer portion of the casing removed; Fig. 3 is a sectional detail view of a porton of the incubator showing the position of an egg therein; Fig. 4 is a sectional elevation of a portion of the incubator showing the auxiliary frame which is used when the chicken is hatched; Fig. 5 is a section upon the line 5—5 of Fig. 6; Fig. 6 is a sectional elevation along the line 6—6 of Fig. 5.

In Fig. 1 is shown the general form of the incubator and a convenient manner of installing the same for use, the incubator being placed upon a table which is furnished with a shelf for supporting a lamp. The water heating drums project beyond the edge of the table, so that the burner of the lamp may engage with the lower drum in a manner hereinafter described.

The incubator casing comprises a base portion which is made up of side pieces 1, and end pieces 2, which end pieces are of general triangular form as shown in the drawing; the upper portion of the casing is formed in two halves 3 and 4, the said upper portion being divided at its central portion, and the parts 3 and 4 are held together by means of a catch 5. The upper portions are hinged to the base by means of hinges 6. This permits either side of the incubator casing to be lowered independently of the other half and to thus expose the interior of that half of the incubator which has been lowered. Each of the portions 3 and 4 is formed with a door 7 which is hinged at 8 to the lower part of the members 3 and 4, and is held in its proper relation to the said members by means of a catch hook 9 upon the top of the said members. The central portions of the doors 7 are occupied by the glass 10 or other suitable material.

Within the casing shelves 11 extend from end to end of the said casing and are secured to the end walls thereof. The said shelves slant toward the center and extend to a point near the center of the casing, the said shelves being spaced a short distance apart to accommodate the heating device which will be hereinafter explained. To the ends of the shelves are secured vertical members 12 which extend a short distance above and below the shelf itself. By virtue of the slanting of the shelves, the eggs will at all times be kept in contact with the heating device, and because of the members 12, it will be impossible for the eggs to roll from the shelves should the heating device be removed. A curtain 11$^a$ is secured upon the underside of each shelf. This curtain extends the entire length of the shelf and hangs down about half the distance between two contiguous shelves. This curtain serves to confine the heat about the upper portion of the egg.

A frame 13 occupies a position in the frame just inside the door 7, which frame comprises side members and top and bottom members, the said frame being held within the casing by means of pins 14 which extend through the end walls of the casing and the side members of the frames. Mounted in these frames and supported by the side members thereof are a series of rollers 15, the said rollers being so arranged in the frame that a roller is opposite the outer end of each of the shelves.

An endless belt 16 passes around the said rollers and extends the entire width of the frame. The object of this endless belt is first to retain the heat within the incubator and secondly to form a convenient means for rolling the eggs to change the point of contact between the eggs and the heating device. Frames 13, as just described, will be used upon both sides of the incubator during the period of incubation up to a time when the chicks are about ready to hatch. At this time, the frames 13 are removed and supplementary frames 17 are inserted in place of the frames 13 and secured in place within the casing in the same manner as were the frames 13. These frames 17 comprise side members and top and bottom members and a series of shelves 18 which extend from side member to side member across the frame. These shelves are so positioned in the frame that each shelf 18 will be adjacent to one of the slanting shelves 11 within the incubator, the said shelves 18 being positioned beyond the outer edge of the shelves and may be situated either above or below the outer edge of the shelf.

The shelves 18 will form convenient places for the chick to push the egg shell after the chick is hatched, the shell occupying the space upon the shelf, and the body of the chick being in contact with the heating device, as shown in Fig. 4.

The heat radiating device for warming the eggs comprises in the specific instance here shown, a vertical water tank which is supported at the central portion of the incubator and between the side members 3 and 4. The heater is engaged by the tops of these side members at its upper end and at its lower end is supported upon the end pieces 2 of the base member. The water tank extends substantially the length of the incubator and substantially the height thereof, but the width of the tank itself is quite small, being adapted to occupy the space between the inner ends of the shelves 11. At the lower end the water tank is formed as a circular tube 20, extending the entire length thereof, and extending through the tubular portion is a pipe 21 which projects at both ends beyond the ends of the water tank. This pipe 21 is divided by a central partition 22 which extends transversely of the tube, dividing said tube into an upper and a lower half of substantially the same capacity. The upper part of the tube 21 is provided with a series of holes 23 and the lower part of the said tube is also provided with a series of holes 24. The said holes 23 and 24 are spaced farther apart upon the tube in the direction of the heating drums in order that the greatest amount of hot water delivered from the said drums may be passed into the tank at points remote from the drums themselves. The opposite ends of the tube 21 form supporting points for the water tank, each end of the said pipe 21 being supported in semi-circular notches formed at the upper portion of the triangular end pieces 2 of the base of the casing. From the lower part of the water tank extends a slanting pipe 25 which pipe projects outside of the base of the casing at a point near the bottom thereof. Upon the outer end of the pipe 21 is secured a drum 26, the inner wall 27 of which is circular in form and has flanges which project slightly beyond the top of the said drum. The interior of the drum and of the pipe 21 are in communication. The pipe 25 is likewise in communication with the interior of the drum 28 which is secured to the drum 26 by means of a pipe 29, the said pipe establishing communication between the interior of the said drums. The drum 28 is formed with a circular opening 30 at the interior thereof for the accommodation of the burner of the heating lamp.

A shield 31 is secured upon the lower portion of the drum 26 and extends downwardly from said drum to a point near the top of the drum 28. The said shield 31 extends entirely around the drum 26. A funnel shaped member 32 is mounted within the shield 31 and is secured at its upper end by means of braces 33 to the inner wall 27 of the drum 26. The larger end of this member is opposite the central opening through the drum 28 and the diameters of both the funnel end and opening in the drum are substantially the same.

The water tank, pipes 21 and 25, together with the drums 26 and 28 and their associated parts are adapted to be removed from the incubator as a unit, the end 2 of the incubator casing being slotted to allow the pipe 25 to be placed in the position shown in Fig. 5. This slot is closed by means of a piece 34 which piece if desired may be secured to the pipe 25 and to the pipe 21 at its lower and upper ends. The engagement of the pipe 25 with the walls of the slot keeps the water tank in vertical position, so that both sides of the casing may be lowered without reference to the tank. A filling orifice 35 is provided upon the upper side of the tank. A lamp 36 is adapted to be placed in a position below and adjacent the drum 28 so that the burner thereof will project into the central opening 30 in the said drum. This lamp is held in its proper position by means of a spring 37 which will press the burner of the lamp into engagement with the drum 28.

When heat is applied to the drums, the water within the tank 19 and within the drums 26 and 28 will be caused to circulate around and through the same. The hottest water within the drum 26 will flow through the upper part of the pipe 21 and through the openings 23 to the interior of the water tank and in circulating through the said tank and becoming cool will sink to the lower portion of the said tank and through the pipe 25 will enter the drum 28. The water within this drum will be warmed by virtue of the contact of the said drum with the burner, which will cause the water to pass through the pipe 29 into the drum 26. It will be obvious that the water in circulating through the drum 28 will keep the burner of the lamp in cool condition and thereby prevent the incubator from catching fire. Owing to the presence of the partition member within the pipe 21, an auxiliary circulation will be set up between the drum 26 and the pipe 21, for the cooler water settling to the lower part of the tank will flow through the holes 24 in the lower part of the pipe 21 and pass through the lower half of said pipe to the drum 26 and will thus supply a portion of the water to this drum which is being taken therefrom through the upper half of the pipe 21. In this way a portion of the cool water returns to the pipe 21 and another portion returns to the drum 28 by way of the pipe 25.

In connection with the heating device and in order to regulate the temperature of the water within the tank so as to supply the degree of heat to the incubator that is desired I employ a thermostat. The water tank at a point slightly above the center thereof is pierced by a rectangular box 38 which projects upon the opposite sides of the water tank, the ends of the said box being closed by removable caps 39. The interior of the box is in communication with a tube 40 which extends through the tank from the top of the box to the top of the water tank. Through this tube extends a rod 41 which at its lower end is connected with an expansion metal disk 42, which is suitably connected with the rod 41 so as to elevate or depress the same according to the temperature of the air within the casing. The member is formed of suitable metal for the purpose and by virtue of the removability of the ends 39 upon the casing, the member 42 may be removed and replaced by other expansion members of varying coefficients, according to the temperature at which it may be desired to maintain the incubator.

Upon the upper portion of the water tank are secured two posts 43 which at their upper ends are screw-threaded and engaged by knurled nuts 44. A member 45 is formed with openings at the opposite ends thereof, through which openings the rods 43 project. Between the top of the water tank and the under side of the member 45 are springs 46 which press the member 45 in a direction away from the top of the tank. The member 45 is likewise provided with an opening so that the rod 41 may project through the same. Ears 47 are formed upon the member 45 or suitably secured thereto, which pivotally support a lever 48, the said lever being triangularly notched at a point 48$^a$ to accommodate the upper end of the rod 41 which is formed with a knife edge to engage the said slot. At the outer end of the lever 48 is secured a chain or cord 49 which depends therefrom along one end of the incubator. At the lower end of the said cord 49 is secured a conically shaped member 50, the said member 50 being so positioned as to engage with the upper flanges upon the inner wall 27 of the drum 26. By means of the knurled nuts 44 the thermostat may be regulated so that the member 50 engages the flange upon the inner wall of the drum 26 when the tank is at the desired temperature.

When the member 50 is seated upon the flanges of the member 27, so as to close the opening at the upper end of the said member, the heated air and products of combustion from the lamp will be conducted through the funnel shaped member 32 out through the top thereof, and down upon the outside, passing below the lower edge of the shield 31. It will thus be apparent that a body of hot air will be maintained in contact with the inner side and bottom of the drum 26, which will raise the temperature of the water in the said drum to a higher temperature, and furthermore, that the heated air passing under the lower edge of the member 31 will be brought into contact with the upper surface of the drum 28, likewise imparting additional heat to that drum. This will cause the water within the tank to rise in temperature, which will affect the air within the casing 38 and cause the expansion of the member 42, thereby raising the rod 41 and elevating the outer end of the rod 48, whereby the conical member 50 will be raised and allow the products of combustion and the heated air to pass from the funnel shaped member 32 out through the upper end of the drum 26. This will cause the water within the drums 26 and 28 to be lowered in their temperature, thereby supplying water at a lower temperature to the tank 19.

With the thermostat which I have herein shown and described, the slightest variation in the temperature of the water will be detected, and the conical member 50 will be regulated so that the temperature of the water within the tank and at all portions thereof may be maintained practically at a constant temperature.

In using the incubator, the eggs are placed upon the shelves 11 upon both sides of the water tank 19, and due to the slanting of the shelves, the said eggs will be constantly in contact with the drum.

From the point of contact between the egg and the heating device, the heat will radiate through the egg in a direction represented by lines *a—b*, as shown in Fig. 3 so that a surface, more or less great, of the egg will be heated according to the extent with which the egg is in contact with the heater, which latter condition will depend upon the shape of the individual egg. This condition of affairs approximates very closely the conditions extant when a hen is hatching the eggs, for, the body of the hen being soft, the egg will press the body inwardly and so a portion of the surface of the egg will be in contact with the hen's body and be heated.

In order to rotate the eggs from time to time and change the point of contact with which the egg engages the tank, I have provided the endless belt 16 heretofore described. When it is desired to rotate the eggs upon one side of the incubator, that side will be lowered so that the eggs will rest upon the belt 16, which may then be moved to turn the eggs the desired amount and the side which has been lowered returned to its original position, and locked by means of the catches 5. The endless belt 16 will also tend to keep the heat within the incubator.

As just described, at that period of the incubation when the chick is about ready to hatch, frames 17 will be supplied in place of the frames 13. These frames will provide a shelf 18 which is beyond the outer end of the shelf 11, so that when the chick has emerged from the shell the same may be pushed by the chick onto the shelf 18, leaving the shelf 11 clear to be occupied by the chick. Due to the slanting of the shelves, the body of the chick will likewise be kept in contact with the water tank, as was the egg, thereby supplying the necessary warmth to the body of the chicken, until such time as they may be removed to the brooder.

Fresh air will be supplied to the interior of the casing, the said air entering through the crevices between the various parts of the casing at the lower part thereof and emerging from the upper part of the casing through the openings 51, the said openings 51 being closed by means of pivoted covers 52 so that the amount of opening may be readily varied so that the desired amount of air may pass through the casing.

Having thus described my invention, I claim:

1. A heating device comprising a tank, a pipe extending through said tank at one end thereof, said pipe being provided with a series of openings, said series of openings extending through a portion of the length of the pipe, the said openings being spaced nearer together as the openings approach one end of the tube, means for introducing a heated fluid into the end of the pipe remote from the openings, and an outlet pipe for said tank.

2. A heating device comprising a tank, a tubular member extending through the tank at one end thereof, a partition member extending throughout the length of the tubular member dividing the same into substantially two portions, said pipe being provided with openings upon the opposite sides of the partition member, a heating drum with which said pipe communicates and an outlet pipe for the tank which also communicates with the drum.

3. In a heating device, a fluid containing tank, a pipe projecting through said tank, a partition in said pipe and extending throughout the length thereof, said pipe having openings upon both sides of the partition therein whereby communication with the tank is had, a heating drum in communication with the said pipe, a pipe extending from the lower part of said tank, a heating drum in communication with said last named pipe, and a connection between the two drums.

4. In a heating device, a fluid containing tank, a heating drum in communication with said tank formed with an opening through the center thereof, a second heating drum below said first heating drum and formed with an opening in the center thereof, said second heating drum being also in communication with the tank, a communication between the drums, a funnel-shaped member having the smaller end thereof extending into the opening in the first mentioned drum, and the larger opening of said funnel-shaped member being above and surrounding the opening in the lower drum, and a burner engaging the opening in the lower drum.

5. In a heating device, a fluid containing tank, a heating drum communicating with said tank, a second heating drum below the first drum also communicating with the tank, both of said drums being formed with alined central openings, a communication between the drums, a funnel-shaped member having the smaller end thereof extending into the opening in the upper drum, the lower end of said funnel-shaped member being slightly above and surrounding the opening in the lower drum, and a shield secured upon the upper drum and depending therefrom, said shield extending nearly to the upper surface of the lower drum.

6. In a heating device, a fluid containing tank, a pipe extending through said tank, a partition within said pipe and extending throughout the length thereof, said pipe having openings on both sides of the partition whereby communication with the tank is had, a heating drum in communication with said pipe, a pipe extending from the lower end of said fluid tank, a heating drum in communication with the last mentioned pipe, said heating drums being provided with alined central openings, and a funnel-shaped member having the smaller end thereof projecting into the opening in the upper tank, the larger end thereof being above and surrounding the opening in the lower drum.

7. In an incubator, a fluid containing tank, a heating drum in communication with said tank, a second heating drum also in communication with the said tank below the first mentioned heating drum, both drums being provided with alined openings, a burner engaging the opening in the second heating drum, a communication between the drums, a funnel shaped member having its smaller end projecting into the opening in the upper heating drum and having the larger end surrounding the opening in the lower drum, a closure member mounted at the top of the opening in the upper drum, a thermostat operatively connected with said fluid containing tank and with the aforesaid closure member, said closure member being adapted when in the open position to allow the products of combustion from the burner to pass upwardly and out of the opening in the first mentioned drum, and when closed to direct the products of combustion from the burner into the space surrounding the funnel shaped member.

8. In a heating device, a fluid containing tank, a heating drum communicating with said tank said drum being provided with an opening therethrough, a second heating drum in alinement with said heating drum and below the same and communicating with the tank, a pipe connecting the two drums, a shield mounted upon the upper drum and depending therefrom, but stopping short of the upper surface of the lower drum, and a damper coöperating with the opening in the upper drum for the purpose described.

9. A heating device comprising a fluid tank, a pipe closed at one end extending through the tank, said pipe being provided with openings which are located in the pipe and which are spaced nearer together as the openings approach one end of the pipe, a receptacle adapted to contain a heated fluid, the end of said pipe remote from the openings being in communication with said receptacle, and another communication from the bottom of the tank to the receptacle.

10. A heating device comprising a fluid holding tank, a pipe closed at one end extending through said tank, a partition in said pipe, said pipe being provided with openings upon opposite sides of the partition, a fluid containing heating drum in communication with said pipe, and a connection with the drum from the lower part of the tank for circulating the water through the drum and tank.

11. A heating device comprising a fluid containing tank, a pipe closed at one end extending through the tank, a partition member extending through said pipe, said pipe being provided with openings upon opposite sides of the partition member, a drum communicating with the open end of the pipe, a second drum, communication between the two drums, and a communication between the lower portion of the tank and the second drum.

12. In an incubator, a casing having a slot formed therein, an upright heating device in said casing, a pipe extending through the tank and projecting beyond the same, said pipe being in communication with the interior of the tank, a pipe extending downwardly from the lower part of the tank and extending through the slot in the casing, the projecting end of the first mentioned pipe being supported in said casing, and means for causing the circulation of a fluid through the pipe and tank.

In testimony whereof, I hereunto affix my signature in the presence of two witnesses.

RALPH R. ROOT.

Witnesses:
S. E. FOUTS,
A. J. HUDSON.

Copies of this patent may be obtained for five cents each, by addressing the "Commissioner of Patents, Washington, D. C."